(12) United States Patent
Huber et al.

(10) Patent No.: US 10,601,824 B2
(45) Date of Patent: Mar. 24, 2020

(54) PROVISION OF ACCESS TO A NETWORK

(71) Applicant: Telia Company AB, Solna (SE)

(72) Inventors: Michael Huber, Taby (SE); Nils-Goran Magnusson, Nynashamn (SE); Per-Ola J. Wester, Trangsund (SE)

(73) Assignee: TELIA COMPANY AB, Solna (SE)

( * ) Notice: Subject to any disclaimer, the term of this patent is extended or adjusted under 35 U.S.C. 154(b) by 170 days.

(21) Appl. No.: 15/806,592

(22) Filed: Nov. 8, 2017

(65) Prior Publication Data

US 2018/0131694 A1 May 10, 2018

(30) Foreign Application Priority Data

Nov. 8, 2016 (EP) ..................................... 16197740

(51) Int. Cl.
*H04L 29/06* (2006.01)
*H04L 9/08* (2006.01)
*H04L 12/66* (2006.01)

(52) U.S. Cl.
CPC ............ *H04L 63/0876* (2013.01); *H04L 9/08* (2013.01); *H04L 12/66* (2013.01); *H04L 29/0621* (2013.01); *H04L 63/0272* (2013.01); *H04L 63/0281* (2013.01); *H04L 63/062* (2013.01); *H04L 63/101* (2013.01)

(58) Field of Classification Search
CPC ... H04L 63/02; H04L 63/029; H04L 63/0807; H04L 63/0876; H04L 63/0884
See application file for complete search history.

(56) References Cited

U.S. PATENT DOCUMENTS

| | | | |
|---|---|---|---|
| 2003/0065919 A1* | 4/2003 | Albert | G06F 21/31 713/168 |
| 2008/0178277 A1* | 7/2008 | Oba | H04L 63/0807 726/10 |
| 2010/0146595 A1 | 6/2010 | Sheymov | |
| 2011/0004760 A1 | 1/2011 | Sharaga et al. | |

(Continued)

FOREIGN PATENT DOCUMENTS

EP 3319277 A1 * 5/2018 ......... H04L 63/0272

OTHER PUBLICATIONS

EP Intention to Grant for Application No. 16197740.0, 5 pages, dated Dec. 19, 2018. (Year: 2018).*

(Continued)

*Primary Examiner* — Ponnoreay Pich
(74) *Attorney, Agent, or Firm* — Young & Thompson

(57) ABSTRACT

Disclosed is a method for granting access for a device to a private local network with a gateway device. The method includes: establishing a connection over the gateway device, wherein a request for accessing the private local network is transmitted; transmitting information on the device; receiving a request for preparing a setup of an authentication procedure; generating a pair of authentication keys; providing one of the generated authentication keys to the device requesting the access to the private local network; initiating the authentication procedure; granting access to the private local network for the device in response to a successful authentication procedure. The invention also relates to a gateway device, a computer program product and a system.

20 Claims, 3 Drawing Sheets

(56) References Cited

U.S. PATENT DOCUMENTS

2013/0290722 A1* 10/2013 Kall .................... H04L 12/4633
713/171
2016/0157094 A1 6/2016 Skog

OTHER PUBLICATIONS

EP Search Opinion for Application No. 16197740.0, 4 pages, dated Jan. 18, 2017. (Year: 2017).*
EP Search Report, dated Jan. 11, 2017, from corresponding EP 16 19 7740 application.

* cited by examiner

PROVISION OF ACCESS TO A NETWORK

TECHNICAL FIELD

The invention concerns in general the technical field of communication networks. More particularly, however not exclusively, the invention concerns access management in the communication network.

BACKGROUND

So called local area networks (LAN) are established in many environments nowadays. For example, a LAN may be established in residences, schools, and office buildings for interconnecting devices, such as computers, through the LAN and in that manner enabling efficient communication between the devices belonging to the LAN. The LAN may technically be implemented in a wired or wireless manner. An example of the wired LAN technology may be Ethernet whereas Wi-Fi represents an example of the wireless LAN technology.

The local area networks are connected to a communication network through a gateway device, which is typically some kind of a router or a modem device. The gateway device implements networking functions and, thus, delivers data packets between the networks. Further, the gateway device may be configured to implement so called private local area network, but also so called public local area network simultaneously. One difference between these two is that an access to network addresses, such as IP addresses, in the private LAN are restricted, but there are no similar restrictions in the public LAN and any device capable of implementing the communication protocol of the LAN in question may access to the public LAN.

One pretty challenging and time consuming task is to couple a device to LAN. This is especially true if the device is such that there is no sophisticated user interface available and the local area network is implemented with a wireless technology, such as Wi-Fi. One solution for the above described situation is so called WPS (Wi-Fi Protected Setup) in which a connection of a device to the Wi-Fi is triggered with a predetermined operation in both the device itself but also the gateway device implementing the local area network. The triggering methods are either so called push-button configuration in which the connection and data encryption if any are initiated by pushing a dedicated WPS button in both of the entities, i.e. the device and the gateway device. An alternative triggering method is utilization of near field communication in the WPS wherein the entities are brought near to each other and necessary information for allowing the device to access the LAN is exchanged over the near field communication.

As may be seen there exists some solutions for bringing a device to the local area network, but they are either cumbersome to implement or insecure by nature. Thus, there is need to develop new solutions which at least partly alleviate the drawbacks of the existing solutions especially in the local area networks implemented with wireless technology.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a gateway device, a computer program product and a system for granting access for a device to a network. Another objective of the invention is that the method, the gateway device, the computer program product and the system for granting access enables a device to access a private local area network.

The objectives of the invention are reached by a method, a gateway device, a computer program product and a system as defined by the respective independent claims.

According to a first aspect, a method for granting access for a device to a private local network with a gateway device is provided, wherein the method comprises: establishing, between the device and a server, a connection over the gateway device, wherein a request for accessing the private local network is transmitted from the device to the server by the gateway device; transmitting information on the device requesting the access to the private local network from the server to a master device by the gateway device; receiving, from the master device, a request for preparing a setup of an authentication procedure; generating a pair of authentication keys by the gateway device; providing, by the gateway device, one of the generated authentication keys to the device requesting the access to the private local network; initiating, by the gateway device, the authentication procedure, wherein the one of the generated authentication keys is received from the device; granting access, by the gateway device, to the private local network for the device in response to a successful authentication procedure performed with the authentication keys.

The request for accessing the private local network may comprise a network address of the server stored in a memory of the device.

Further, the request for accessing the private local network may comprise an identifier of the device.

An indicator to set up an authentication framework between the device and the server may be detected from the request for establishing the connection. The setting up of the authentication framework may be performed in response to a detection of the indicator to set up the authentication framework. For example, the authentication framework may be an extensible authentication protocol, EAP.

The initiation of the authentication procedure by the gateway device may be performed in response to a receipt of an instruction message from the master device to initiate the authentication procedure.

The initiation of the authentication procedure by the gateway device may be performed according to a timing scheme received from the server through the master device.

During the authentication procedure the provided key may be received by the gateway device from the device.

According to a second aspect, a gateway device for granting access for a device to a private local network is provided wherein the gateway device comprising: at least one processor; at least one memory including computer program code; the at least one memory and the computer program code configured to, with the at least one processor, cause the gateway device to perform: establish, between the device and a server, a connection, wherein a request for accessing the private local network is transmitted from the device to the server; transmit information on the device requesting the access to the private local network from the server to a master device; receive, from the master device, a request for preparing a setup of an authentication procedure; generate a pair of authentication keys; provide one of the generated authentication keys to the device requesting the access to the private local network; initiate the authentication procedure, wherein the one of the generated authentication keys is received from the device; grant access to the private local network for the device in response to a successful authentication procedure performed with the authentication keys.

The gateway device may be configured to determine a network address of the server from the request for accessing the private local network.

The request for accessing the private local network may comprise an identifier of the device.

The gateway device may be configured to detect an indicator to set up an authentication framework between the device and the server from the request for establishing the connection. The gateway device may also be configured to set up the authentication framework in response to a detection of the indicator to set up the authentication framework. The gateway device may be configured to set up an extensible authentication protocol, EAP, as the authentication framework.

The gateway device may be configured to perform the initiation of the authentication procedure in response to a receipt of an instruction message from the master device to initiate the authentication procedure.

The gateway device may be configured to perform the initiation of the authentication procedure according to a timing scheme received from the server through the master device.

The gateway device may be configured to receive the provided key from the device during the authentication procedure.

According to a third aspect, a computer program product comprising at least one computer-readable storage medium having computer-executable program code instructions stored therein is provided for performing the method as described above when the computer program product is executed on a computer.

According to a fourth aspect a system for granting access for a device to a private local network is provided, wherein the system comprising: a gateway device, a server, a master device; wherein the system: a connection between the device and a server over the gateway device is established, wherein a request for accessing the private local network is transmitted from the device to the server by the gateway device; information on the device requesting the access to the private local network is transmitted from the server to a master device by the gateway device; a request for preparing a setup of an authentication procedure is received from the master device; a pair of authentication keys is generated by the gateway device; one of the generated authentication keys is provided to the device requesting the access to the private local network by the gateway device; the authentication procedure is initiated by the gateway device wherein the one of the generated authentication keys is received from the device; access is granted for the device to the private local network in response to a successful authentication procedure performed with the authentication keys.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality. Moreover, the expression "a number of" may herein refer to any positive integer starting from one (1). Further, the expression "a plurality of" may refer to any positive integer starting from two (2), respectively.

BRIEF DESCRIPTION OF FIGURES

The embodiments of the invention are illustrated by way of example, and not by way of limitation, in the figures of the accompanying drawings.

DESCRIPTION OF SOME EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
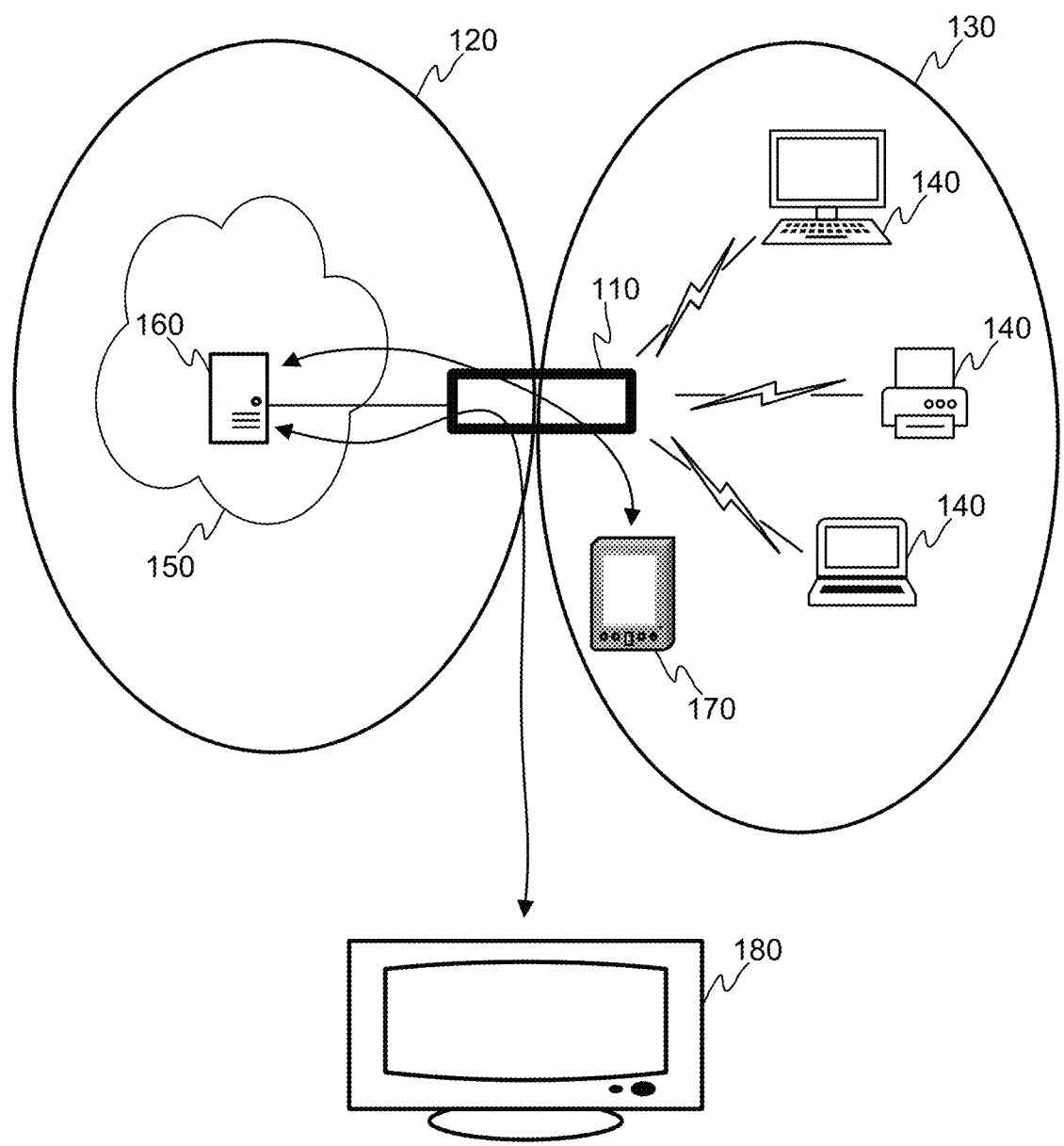
FIG. 1 illustrates schematically a system as an exemplifying framework for describing one or more embodiments of the invention.

In FIG. 1 it is schematically illustrated a communication environment as an exemplifying framework for describing one or more embodiments of the present invention. The communication environment as depicted in FIG. 1 comprises at least some components and/or entities being relevant in at least some implementations of the present invention. However, FIG. 1 does not necessarily comprise, or illustrate, all necessary components and/or entities for establishing the communication environment and they are herein omitted in order to maintain clarity when describing the present invention and/or at least some embodiments of it.

The communication environment comprises a gateway device 110, such as a router, for implementing networking functions in order to connect one or more devices 140 belonging to a private local area network 130 to a public network 120. The gateway device 110 is advantageously configured to serve both the private local area network 130 and the public network 120. The private local area network 130 is configured to host one or more devices 140, which may e.g. be personal computers, laptops, printers or any devices being able to be connected to the private local area network 130. The private local area network 130 may be implemented in a wireless manner and the gateway device 110 provides access for the private local area network 130 to the public network 120 and for devices 140 belonging to the private local area network 130. The public network 120 refers to network, or part of it, into which it is possible to access with any networking device. An example of such a public network is Internet 150, as is schematically illustrated in FIG. 1.

The present invention specifically relates to a solution by means of which a device 180 may be provided, i.e. granted, access to the private LAN 130 by using another device, called as a master device 170 in this context, in the procedure for granting the access. The device 180, even if illustrated as a smart television in FIG. 1, may be any other device which may be configured to utilize services provided by a wireless private local area network 130 if the device 180 is granted the access to the private LAN 130. More specifically, the device 180 is configured to implement at least one radio communication protocol the gateway device 110 implements either directly or indirectly through a separate base station (not illustrated in FIG. 1). The master device 170 may be any device which is configured to implement at least one radio communication protocol the gateway device 110 implements either directly or indirectly through a separate base station (not illustrated in FIG. 1) and which is configured to generate signals for instructing different entities to perform predetermined operations. Some non-limiting examples of the master device 170 are a mobile terminal and a tablet computer or any similar.

Figure 2:
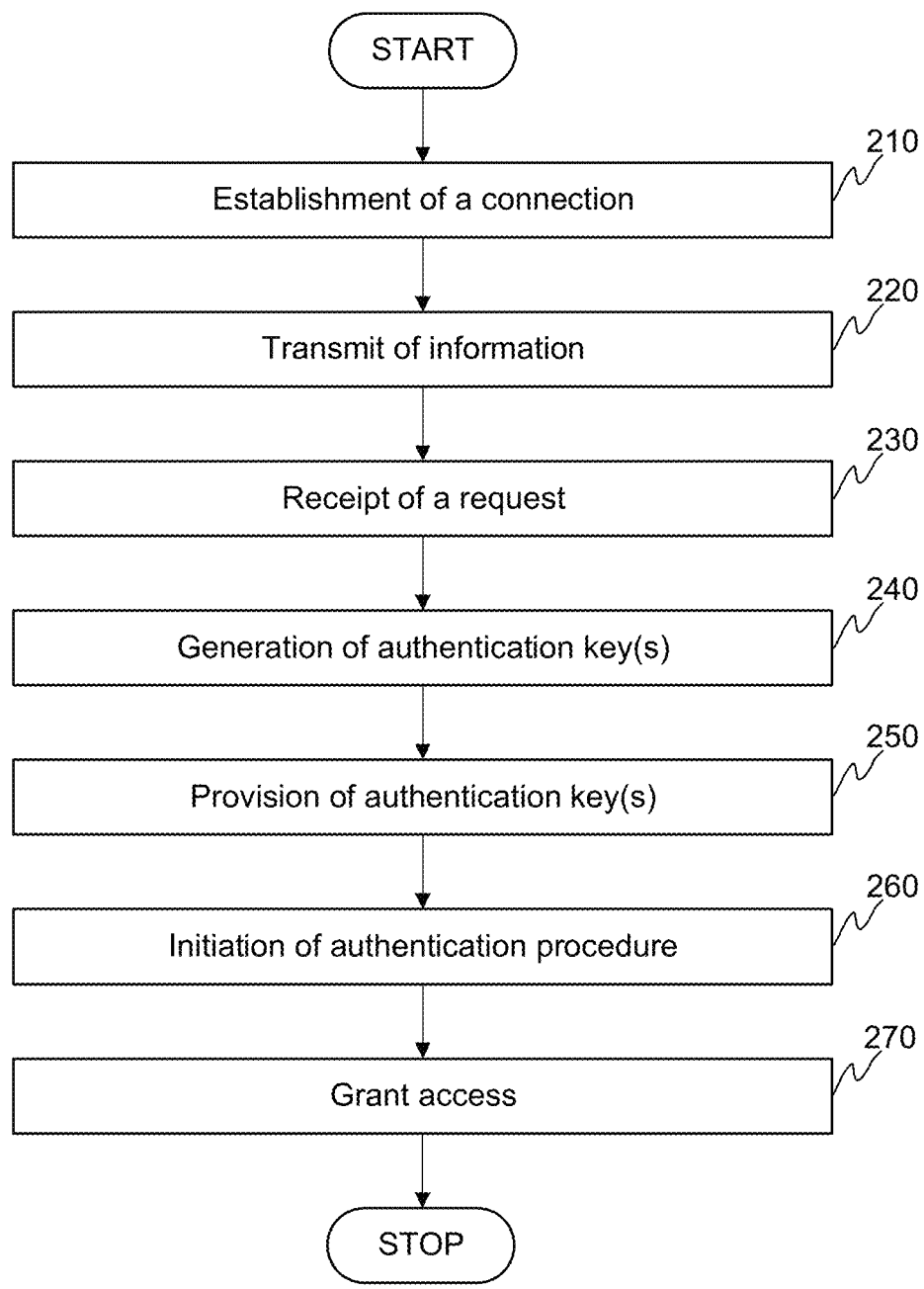
FIG. 2 illustrates schematically a method according to an embodiment of the invention.

The solution according to an example of the present invention is schematically illustrated in FIG. 2 defining at least some of method steps performed by the gateway device 110. At least some aspects of the method steps are described in the following:

Regarding Step 210:

The device 180 is brought to an operational area of the gateway device 110 wherein the operational area refers to coverage of a wireless network implemented by the gateway device 110 either directly or indirectly through a separate base station. The device 180 is equipped with necessary wireless device(s) for monitoring availability of wireless networks and accessing to them, if possible, either automatically or with manual operations performed by a user. In this context the accessing refers to a utilization of wireless network resources provided by the gateway device 110 in order to access at least the public network, and to couple to the gateway device 110 wirelessly.

In step 210 the gateway device 110 is configured to receive, either automatically or in response to predetermined actions, a request for establishing a connection 210 over the gateway device 110 to a server 160.

The server 160 may be a predetermined network entity whose network address is advantageously stored in a memory of the device 180 and included in the request for establishing the connection. Thus, the device 180 may be configured to request access to the private local network 130 by transmitting the request to the server 160. For example, the server 160 may be hosted by a manufacturer of the device 180, which enables, or at least makes easier, the preconfiguring of the device 180 to connect to the server 160 as described. In the establishment of the connection the device 180 may be configured so that it connects automatically to the wireless network provided by the gateway device 110. In some embodiment the device 180 may be provided with some authentication framework, such as extensible authentication protocol (EAP), for establishing a secure connection and/or accessing to the server 160. In this kind of solution the device 180 may also be configured to detect if the wireless network, and especially the gateway device 110, enables, or supports, setting up an authentication framework, and thus enabling e.g. EAP forwarding i.e. forwarding data packets under EAP. The detection may e.g. be arranged by deriving information from a network identifier, such as SSID, broadcast by the gateway device 110 either directly or indirectly. In response to the detection that the authentication framework may be established through the gateway device 110 the device 180 may be configured to indicate it in the request, and as a result the connection between the device 180 and the server 160 may be established and the request is transmitted to the server 160. In other words, settings in the gateway device 110 may be configured so that the gateway device 110 supports, i.e. allows, using it for setting up a predetermined authentication framework, such as EAP.

The server 160 may, in response to the request, store an indication on the request in a memory of the server 160, or into any memory unit accessible to the server 160. In case the request carries any additional information, such as a device identifier or similar, it may also be stored in the server and used e.g. for searching the request, as will be discussed later.

Regarding Step 220:

The gateway device 110 is configured to transmit information 220 on the device requesting the access to the private local area network to a master device 170. The information may be the one stored and/or maintained in the server 160 in response to the receipt of the request (cf. step 210) in the server 160.

The transmit of information may be triggered in a plurality of ways. According to an embodiment the transmit may be initiated in response to a request received in the server 160 from the master device 170. For example, a dedicated application, or at least functionality, may be installed and executed in the master device 170, which causes the master device 170 to request information from the server 160 if the server 160 has received any access requests to the private local area network 130. Such a request from the master device 170 may carry information on the device 180, such as device identifier or any other identifier, which may be used in the server 160 for identifying the device or the access request received in step 210. In other words, the request may cause the server 160 to detect internally, i.e. from the memory, if there are any indications of the received access requests and to provide the information to the master device 160. According to an embodiment of the present invention the server may define a communication address of the master device 170 from the request received in the server 160, if the request carries the communication address.

According to some other embodiment the transmit of information may be initiated by the server 160 to the master device 170. This kind of implementation may require that a predetermined communication address is defined for the master device 170 in the server 160 and the communication address is linked to the device 180 requesting the access beforehand. For example, when the device 180 is acquired it may be arranged that at least one communication address for the master device 170 or the user using the master device 170 is stored, or registered, in the server 160 in that context for managing the access requests from the device 180 at some point of time. The communication address of the master device 170 may e.g. be linked to some identifier, such as device identifier, in the memory, wherein the device identifier is delivered by the device 180 together with the access request to the private LAN to the server 160 in the step 210 as described. The server initiated transmit of information may e.g. be triggered according to some predetermined time pattern, such as regularly (e.g. daily). According to some further embodiment a user may create a user profile in the server 160 in which profile he/she may add a communication address and e.g. link any device identifiers to the user profile.

In step 220 the information on the request to access the private LAN from the device 180 is configured to be delivered to the master device 170 being connected in the private local area network 130. For example, in the implementation of the invention wherein the master device 170 is arranged to execute an application by means of which the master device 170 may inquire requests from the server 160 the master device 170 advantageously utilizes wireless network resources provided by the gateway device 110 and the information on the request(s) in the server 160 are advantageously delivered over the same session as the inquiry is made. Thus, the gateway device 110 transmits the information to the master device 170. On the other hand, if the server 160 delivers automatically the information on at least one request to the master device 170, the server 160 may be configured to use the communication address defined in the server 160 for the delivery of the information on the request(s).

Regarding Step 230:

In response to a receipt of information that the device 180 has requested the access to the private local area network 130 the master device 170 is configured compose a request for preparing a setup of an authentication procedure and transmit it to the gateway device 110 serving the private local area network 130. Hence, the gateway device 110 receives such a request 230 from the master device 170. The request may comprise a predetermined instruction, e.g. in a predetermined message, which causes the gateway device 110 to prepare the setup of the authentication procedure. According to an embodiment of the invention the request for preparing the setup of the authentication procedure comprises an indication to the gateway device 110, which causes the gateway device 110 to generate a pair of authentication keys, as will be discussed next.

Regarding Step 240:

As mentioned, the gateway device 110 may be configured to generate a pair of authentication keys 240 in response to the receipt of the request in the step 230. In other words, the gateway device 110 may be configured to initiate a predetermined procedure, such as a retrieval of a pair of keys from data storage accessible to it or an initiation of a procedure for generating the pair of keys. The generation may be arranged to be performed internally in the gateway device 110 or externally in some other entity with whom the gateway device 110 may be configured to communicate in order to generate the pair of keys and obtain the keys for a further use as will be described.

Moreover, the gateway device 110 may be configured to store at least one of the generated keys at least temporarily in a memory accessible to the gateway device 110.

Regarding Step 250:

When the pair of keys is generated the gateway device 110 may be configured to provide at least one of the generated keys 250 to the device 180 requesting the access to the private local network over a connection which is established when the device 180 was brought to the operational area of the wireless network provided by the gateway device 110. This may refer to a connection established with DHCP (Dynamic Host Configuration Protocol), for example.

Additionally, the gateway device 110 may be configured to generate an acknowledgement to the master device 170 indicating that the pair of authentication keys is generated and that the at least one of the keys is provided to the device 180.

Regarding Step 260:

Next, an authentication procedure may be initiated between the gateway device 110 and the device 180. The initiation of the authentication procedure may be performed in a plurality of ways. According to one preferred embodiment of the present invention the initiation of the authentication procedure 260 is performed under at least partial control of the server 160. This refers to a non-limiting implementation of the invention in which the master device 170, in response to a receipt of an acknowledgement from the gateway device 110 as described in step 250, may be configured to acknowledge the situation to the server 160 e.g. over an established communication channel with the application executed in the master device 170. In other words, the master device 170 is configured to monitor if an acknowledgement from the gateway device 110 is received and in response to that it is configured to generate a message, or any signal, which indicates to the server 160 that the authentication keys are generated. In response to the receipt of the acknowledgement in the server 160 the server 160 may be configured to generate at least one signal, i.e. an instruction message, to both the master device 170 and to the device 180 indicating that the authentication procedure shall be initiated. The signal to the master device 170 is configured to carry information for instructing the master device 170 to request the gateway device 110 to initiate the authentication procedure. Advantageously, the master device 170 is configured to forward, or generate, the signal to the gateway device for initiating the authentication procedure, such as WPS (Wi-Fi Protected Setup). Correspondingly, the server 160, as mentioned, may generate the signal for requesting the device 180 to initiate an authentication procedure, such as WPS (Wi-Fi Protected Setup). Advantageously, the server 160 is configured to generate the signals for the master device 170 and the device 180 synchronously in order to initiate the authentication procedure so that both the gateway device 110 and the device 180 are performing the authentication procedure at least in part at the same time. In other words, the generation of the signal(s) by the server 160 causes both the gateway device 110 under control of the master device 170 and the device 180 to perform the authentication procedure at least in part wirelessly. In the authentication procedure the generated keys (cf. step 240) are used by the gateway device 110 and the device 180.

The initiation of the authentication procedure may, according to another embodiment of the invention, be arranged so that the server 160 when delivering information on the received request for accessing the private local network to the master device 170 adds an indication, such as a timing scheme i.e. a time stamp, in the information when the authentication procedure 260 shall be initiated. This information may be further delivered to the gateway device 110 by the master device 170. Similarly, the server 160 may be configured to generate a message to the device 180 with the same indication, such as a timing scheme i.e. a time stamp, for instructing the device 180 to initiate the authentication procedure at the same time with the gateway device 110. Additionally, the messages may carry any applicable reference information, which may be used for synchronizing the initiation of authentication procedure if there is no common clock signal for the mentioned elements. In this kind of embodiment the server 160 is advantageously aware of a period of time which is needed for generating the authentication keys (cf. step 240) and providing at least one of them to the device 180 by the gateway device 110. With the information the server 160 may adjust the instant of time represented in the time stamp such that the entities, i.e. the gateway device 110 and the device 180 possesses the necessary keys prior the authentication procedure is initiated 260.

During the authentication procedure the gateway device 110 may receive the provided key back from the device 180 and the gateway device 110 may be configured to perform a predetermined operation with the received key and the other key used for the authentication procedure by the gateway device 110. The predetermined operation may be any known solution by means of which it may be checked that the keys used in the authentication procedure match with each other. Regarding Step 270:

The authentication procedure is arranged to generate a decision if an access to the private local area network may be granted 270 to the device 180 or not. If the authentication procedure performed with the keys is successful, the device 180 may access the private local area network and start enjoying the services the private LAN offers to devices coupled to it.

Figure 3:
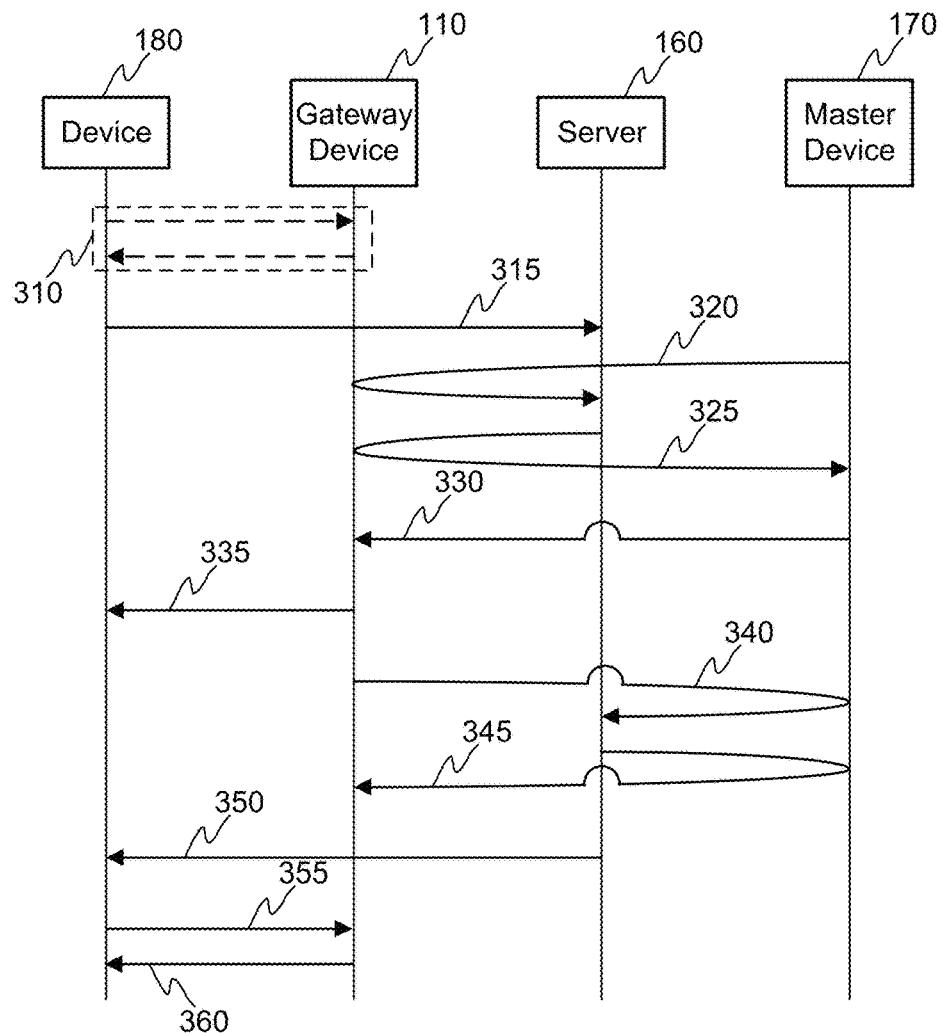
FIG. 3 illustrates schematically a signaling diagram according to an embodiment of the invention.

For clarifying the signaling between the mentioned entities being involved in the implementation of at least one embodiment of the invention FIG. 3 is hereby referred. FIG. 3 illustrates at least some of the signals which are necessary to implement the embodiment of the invention in question. A block referred with 310 illustrates a preliminary step in which a device 180, such as a television, is connected to a gateway device 110 implementing either directly or indirectly operations of a Wi-Fi base station, or a similar wireless network technology. The connection may be established with a request by the device 180, which is responded by the gateway device 110. The preliminary step 310 may comprise a provision of credentials with a known mechanism. Next, when the device 180 is connected with the gateway device 110, a connection, e.g. with EAP framework, may be established from the device 180 to a server 160 through the gateway device 110. This is referred with arrow 315 in FIG. 3, and is described in more detail in the context of step 210 of FIG. 2. According to the embodiment the server 160 receives an inquiry from the master device 170 through the gateway device 110, wherein the master device 170 requests information if the server 160 has received any requests for accessing a private local area network. The inquire may carry information, such as a device identifier, on the device 180 whose request is inquired. The inquiry is referred with arrow 320 in FIG. 3. The server 160 may be configured to transmit at least some information indicating if such pending requests exists in the server 160 and deliver the information to the master device through the gateway device 110 (arrow 325 in FIG. 3). Next, the master device 170 may generate a request for preparing a setup of an authentication procedure and transmit it to the gateway device 110 serving the private local area network 130 (arrow 330 in FIG. 3). The request may be transmitted over a connection, such as established with DHCP, between the master device 170 and the gateway device 110, or, for example, so that the request for preparing the setup is indicated e.g. in a header field of another message, which header field information is accessible by the gateway device 110, when forwarding the message itself to another entity, such as to the server 160. The request for preparing the setup of the authentication procedure the gateway device 110 may be configured to generate authentication keys and transmit at least one authentication key to the device 180 (arrow 335 in FIG. 3). Moreover, the gateway device 110 may, according to the embodiment of the invention, be configured to acknowledge the server 160 through the master device 170 on the generation of the authentication keys and/or transmit of the at least one authentication key to the device 180 (arrow 340 in FIG. 3). Next, the server 160 may be configured to generate a messages to the gateway device 110 through the master device 170 and to the device 180 e.g. over the EAP framework, which messages instruct the mentioned entities to initiate the authentication procedure (arrows 345 and 350 in FIG. 3). Advantageously, the generated keys are used in the authentication procedure in a known manner. For example, the messages 345 and 350 may cause the corresponding devices to initiate so called WPS by advertising themselves with the authentication keys and in response to that the device 180 may e.g. deliver the authentication key to the gateway device 110 (arrow 355 in FIG. 3). The gateway device 110 may be configured to perform predetermined operations by using the authentication keys in order to check if they match with each other. If that is the case, the gateway device 110 may be configured to inform the device 180 on a grant of an access to the private local area network (arrow 360). Moreover, the gateway device 110 may be configured to perform internal operations for providing the access to the private local area network and to any other devices in the private local area network according to the setup of the private local area network. As mentioned the signal diagram in FIG. 3 is an example and is not limiting the inventive idea of the present invention to that embodiment only.

Figure 4:
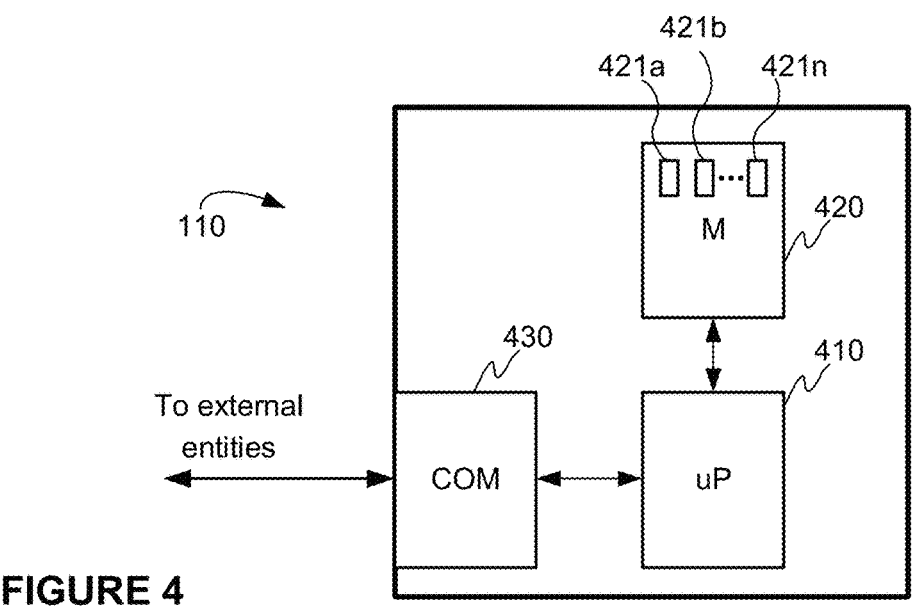
FIG. 4 illustrates schematically a gateway device according to an embodiment of the invention.

FIG. 4 schematically illustrates a gateway device 110 according to an example of the invention. The gateway device 110 is configured, at least partly, to implement the present invention as described. The execution of the present invention may be achieved by arranging a processor 410 to execute at least some portion of computer program code 421*a*-421*n* stored in a memory 420 causing the processor 410, and, thus, the gateway device 110 to implement one or more method steps as described. The processor 410 is thus arranged to access the memory 420 and retrieve and store any information therefrom and thereto. Moreover, the processor 410 may be configured to control the communication through a communication interface 430 with any external unit, such as with at least one server 160, with at least one device 140, with at least one device 180 and with at least master device 170. In other words, the gateway device 110 may be communicatively coupled to at least some of the mentioned entities either directly or indirectly e.g. through a communication network or a data network, such as Internet. The processor 410 may also be configured to control overall operability of the gateway device 110 according to instructions stored in the memory 420 in a form of computer program code and parameters thereto. For sake of clarity, the processor herein refers to any unit suitable for processing information and control the operation of the gateway device 110 in achieving a desired operation as described. The mentioned operations may e.g. be implemented with a microcontroller solution with embedded software. Similarly, the invention is not limited to a certain type of memory only, but any memory type suitable for storing the described pieces of information may be applied in the context of the present invention. The present invention is described above so that the method is to be implemented in one gateway device 110. The implementation may also be done in a decentralized manner i.e. between multiple gateway devices that are operatively coupled to each other either directly or indirectly. Moreover, at least some of the operations or functionalities of the gateway device 110 may be configured to be implemented in a distributed manner referring to a situation that the gateway device 110 may be configured to perform operations at least partly for one device, such as device 180, over one connection and at least partly for another device, such as master device over another connection. For example, the initial communication between the device 180 and the server 160 may be performed over an open connection, whereas the communication between the gateway device 110 and the master device 170 may be performed in a private local network 130. This kind of arrangement and implementation may e.g. be achieved by having a plurality of processing units configured to perform specific task whose operations may be separated from each other. The processing units may e.g. access to a common memory, or memory unit, but are configured to perform operations individually. Naturally, some coordination between the processing units may be arranged, especially if the device 180 is granted access to the private local network 130.

Some aspects of the present invention may also relate to a non-transitory computer-readable storage medium storing at least portions of computer program code, wherein the portions of computer program code are computer-executable program code instructions to implement the method steps in a gateway device 110 as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a sub-routine, element or other unit suitable for use in a computing environment. As indicated, the computer program code comprises instructions for causing the gateway device 110 to perform one or more of the method steps as described above.

The term indication in the description herein shall be understood to refer to a piece of data included in the corresponding message or signal, which either directly or indirectly provide necessary information to the recipient for taking predetermined actions if any.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for granting access for an accessing device to a private local network with a gateway device, the method comprising:
    establishing, between the accessing device and a server, a connection over the gateway device, a request for accessing the private local network being transmitted from the accessing device to the server by the gateway device;
    transmitting information on the accessing device from the server to a master device by the gateway device;
    receiving, from the master device, a request for preparing a setup of an authentication procedure;
    generating a pair of authentication keys by the gateway device;
    providing, by the gateway device, one of the generated authentication keys to the accessing device;
    initiating, by the gateway device, the authentication procedure, the one of the generated authentication keys being received from the accessing device; and
    granting access, by the gateway device, to the private local network for the accessing device in response to a successful authentication procedure performed with the authentication keys.

2. The method of claim 1, wherein the request for accessing the private local network comprises a network address of the server stored in a memory of the accessing device.

3. The method of claim 1, wherein the request for accessing the private local network comprises an identifier of the accessing device.

4. The method of claim 1, wherein an indicator to set up an authentication framework between the accessing device and the server is detected from the request for establishing the connection.

5. The method of claim 4, wherein the setting up of the authentication framework is performed in response to a detection of the indicator to set up the authentication framework.

6. The method of claim 5, wherein the authentication framework is an extensible authentication protocol (EAP).

7. The method of claim 1, wherein the initiation of the authentication procedure by the gateway device is performed in response to a receipt of an instruction message from the master device to initiate the authentication procedure.

8. The method of claim 1, wherein the initiation of the authentication procedure by the gateway device is performed according to a timing scheme received from the server through the master device.

9. The method of claim 1, wherein, during the authentication procedure, the provided key is received by the gateway device from the accessing device.

10. A gateway device for granting access for an accessing device to a private local network, the gateway device comprising:
    at least one processor; and
    at least one memory including computer program code;
    wherein the at least one memory and the computer program code are configured to, with the at least one processor, cause the gateway device to:
        establish, between the accessing device and a server, a connection, a request for accessing the private local network being transmitted from the accessing device to the server,
        transmit information on the accessing device from the server to a master device,
        receive, from the master device, a request for preparing a setup of an authentication procedure,
        generate a pair of authentication keys,
        provide one of the generated authentication keys to the accessing device,
        initiate the authentication procedure, the one of the generated authentication keys being received from the accessing device, and
        grant access to the private local network for the accessing device in response to a successful authentication procedure performed with the authentication keys.

11. The gateway device of claim 10, wherein the gateway device is configured to determine a network address of the server from the request for accessing the private local network.

12. The gateway device of claim 10, wherein the request for accessing the private local network comprises an identifier of the accessing device.

13. The gateway device of claim 10, wherein the gateway device is configured to detect an indicator to set up an authentication framework between the accessing device and the server from the request for establishing the connection.

14. The gateway device of claim 13, wherein the gateway device is configured to set up the authentication framework in response to a detection of the indicator to set up the authentication framework.

15. The gateway device of claim 14, wherein the gateway device is configured to set up an extensible authentication protocol (EAP) as the authentication framework.

16. The gateway device of claim 10, wherein the gateway device is configured to perform the initiation of the authentication procedure in response to a receipt of an instruction message from the master device to initiate the authentication procedure.

17. The gateway device of claim 10, wherein the gateway device is configured to perform the initiation of the authentication procedure according to a timing scheme received from the server through the master device.

18. The gateway device of claim 10, wherein the gateway device is configured to receive the provided key from the accessing device during the authentication procedure.

19. A computer program product comprising at least one non-transitory computer-readable storage medium having computer-executable program code instructions stored therein for performing the method of claim 1 when the computer program product is executed on a computer.

20. A system for granting access for an accessing device to a private local network, the system comprising:
   a gateway device;
   a server configured to connect with the accessing device over the gateway device, a request for accessing the private local network being transmitted from the accessing device and received at the server by the gateway device; and
   a master device configured to receive information on the accessing device transmitted from the server to the master device by the gateway device, the master device being configured to transmit a request for preparing a setup of an authentication procedure,
wherein the gateway device is configured to generate a pair of authentication keys, one of the generated authentication keys being provided to the accessing device by the gateway device, the authentication procedure being initiated by the gateway device, the one of the generated authentication keys being received from the accessing device, and
the accessing device is configured to be granted access to the private local network in response to a successful authentication procedure performed with the authentication keys.

* * * * *